United States Patent [19]

Kovacic et al.

[11] 3,728,720

[45] Apr. 17, 1973

[54] KEYBOARD TRANSMITTER

[75] Inventors: Charles R. Kovacic, Mundeline; Robert M. Schildgen, Northbrook; Hilding A. Anderson, Lake Zurich, all of Ill.

[73] Assignee: SCM Corporation, New York, N.Y.

[22] Filed: Feb. 14, 1969

[21] Appl. No.: 799,287

[52] U.S. Cl. .........340/365, 317/101 C, 317/101 CM

[51] Int. Cl. .......................................G08c 9/08

[58] Field of Search......................340/365; 178/17 A, 178/17 C, 79

[56] References Cited

UNITED STATES PATENTS

| | | | |
|---|---|---|---|
| 2,932,816 | 4/1960 | Stiefel | 178/79 |
| 3,331,067 | 7/1967 | O'Brien | 340/365 |

*Primary Examiner*—Thomas B. Habecker

*Attorney*—Mason, Kolehmainen, Rathburn & Wyss

[57] ABSTRACT

There is disclosed a keyboard transmitter having symbol keys, shift and shift-lock keys, a symbol key interlock for preventing more than one symbol key from being depressed at a time, a keyboard lock for locking up the keyboard, a weatherseal forming a seal between each key and the keyboard housing, a plurality of printed circuit boards extending transversely with respect to the symbol keys, a plurality of switches mounted by each printed circuit board, each symbol key being aligned with one of said switches, and code means mounted by each printed circuit board adjacent its respective switch.

2 Claims, 22 Drawing Figures

INVENTORS
CHARLES R. KOVACIC
ROBERT M. SCHILDGEN
HILDING A. ANDERSON
Joseph J. Mass
ATTORNEY

KEYBOARD TRANSMITTER

FIELD OF THE INVENTION

This invention relates to the art of keyboard transmitters.

SUMMARY OF THE INVENTION

The invention comprises a subassembly removably mounted relative to a frame and includes movably mounted symbol keys and a keyboard interlock for enabling only one symbol key at a time to be depressed, a keyboard lock, including a movably mounted locking member disposed between two of the printed circuit boards and means including a drive motor disposed beyond the ends of the circuit boards for moving said locking member between a first position out of engagement with said keys and a second position in locking engagement with said keys, signal generating means including the plurality of printed circuit boards mounted by said frame and a separate switch for each respective symbol key, code means mounted by each circuit board, the printed circuit boards and switches being arranged in parallel rows, the keys extending generally perpendicularly across said rows, only one switch of said parallel rows being in alignment with and actuatable by one key, and means electrically connecting each code means with its respective switch and with printed conductors of the printed circuit board to effect generation of a symbol corresponding to a selected key.

DESCRIPTION OF THE PREFERRED EMBODIMENT

Figures 16, 17, 18, 19, 20, 21, 22:
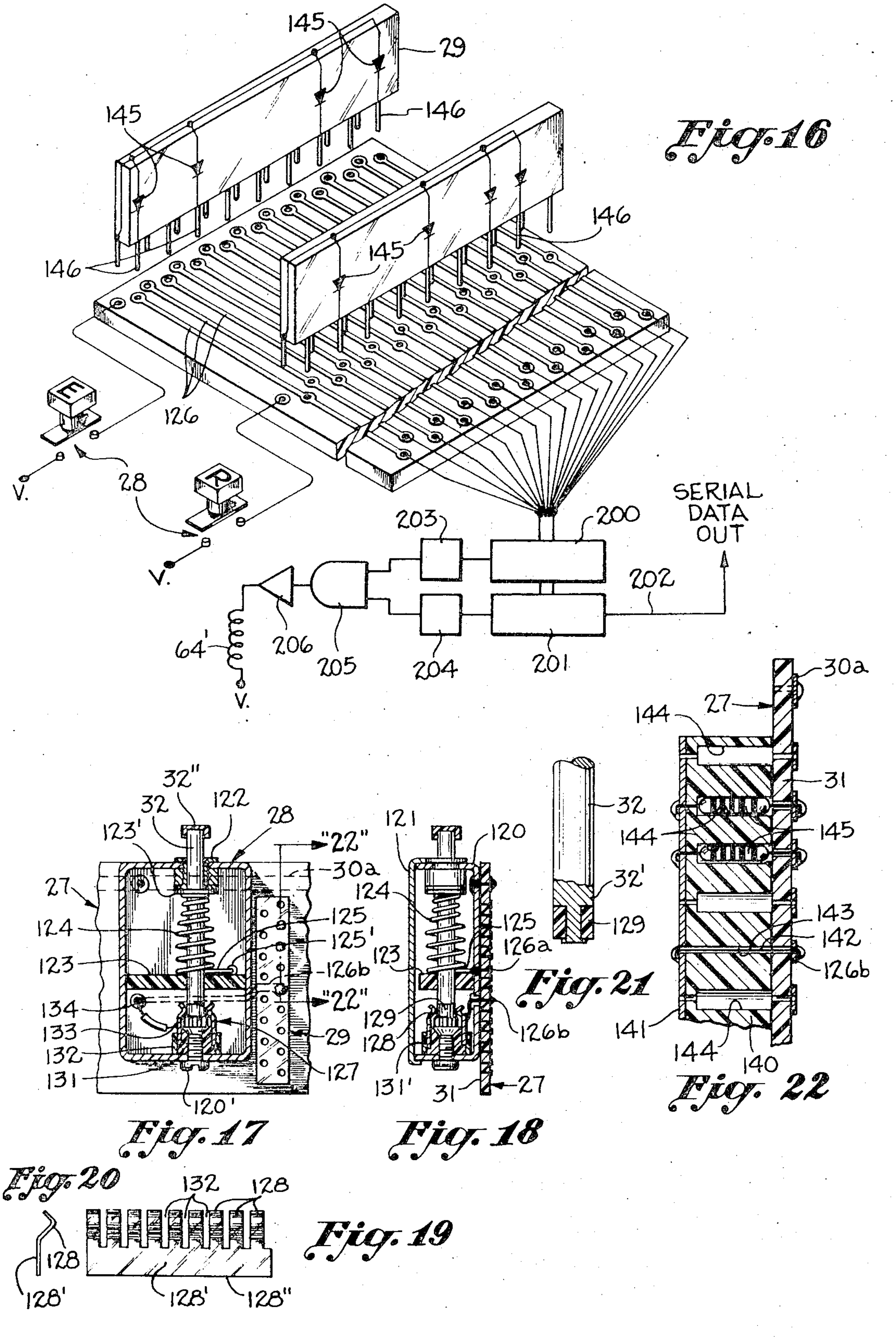
FIG. 16 is a diagrammatic view showing the manner in which the signals can be generated and stored by the keyboard transmitter.
FIG. 17 is an elevational view, mainly in section, showing a fragmentary portion of the printed circuit board, a switch, and an associated code device.
FIG. 18 is a sectional view through the switch and printed circuit board shown in FIG. 17.
FIG. 19 is an elevational view of a formed strip of electrically conductive material which is used to provide the fixed contact of the switch shown in FIGS. 17 and 18.
FIG. 20 is a left side elevational view of the strip shown in FIG. 19.
FIG. 21 is a fragmentary elevational view partly in section showing the movable contact of the switch.
FIG. 22 is a sectional view taken along line 22—22 of FIG. 17.

Referring to the drawings, there is shown a keyboard transmitter generally indicated at 20 which includes a housing 21 having a base plate 22, a top plate 23, side and end plates 24, and a door 25. The base plate 22 has four parallel grooves 26 in which printed circuit boards 27 are received. Each printed circuit board 27 mounts a plurality of spaced apart switches 28. A code device 29 is disposed next adjacent its associated switch 28. Thus, all the switches 28 and their respective code devices 29 (FIG. 10) are mounted to one side of the circuit board 27 and establish electrical connection with printed conductors 30 (FIG. 11) on the other side of the printed circuit boards 27. The conductors 30 are printed on an electrically nonconductive backing 31, as illustrated in FIGS. 11, 18 and 22.

Figure 4:
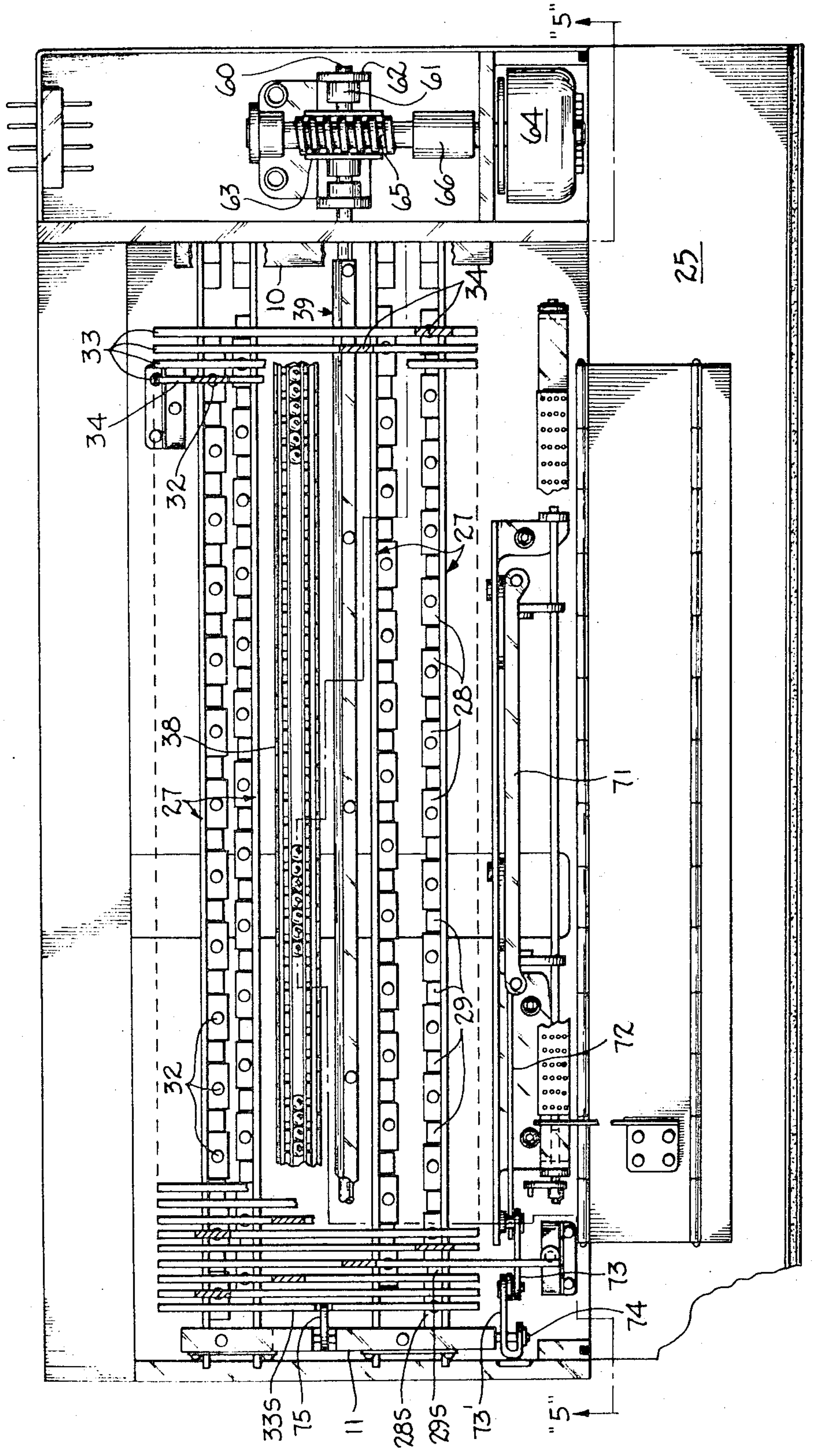
FIG. 4 is a top plan view of the keyboard transmitter shown in FIG. 1 with the top plate removed and with the door opened.
Figures 9, 10, 11:
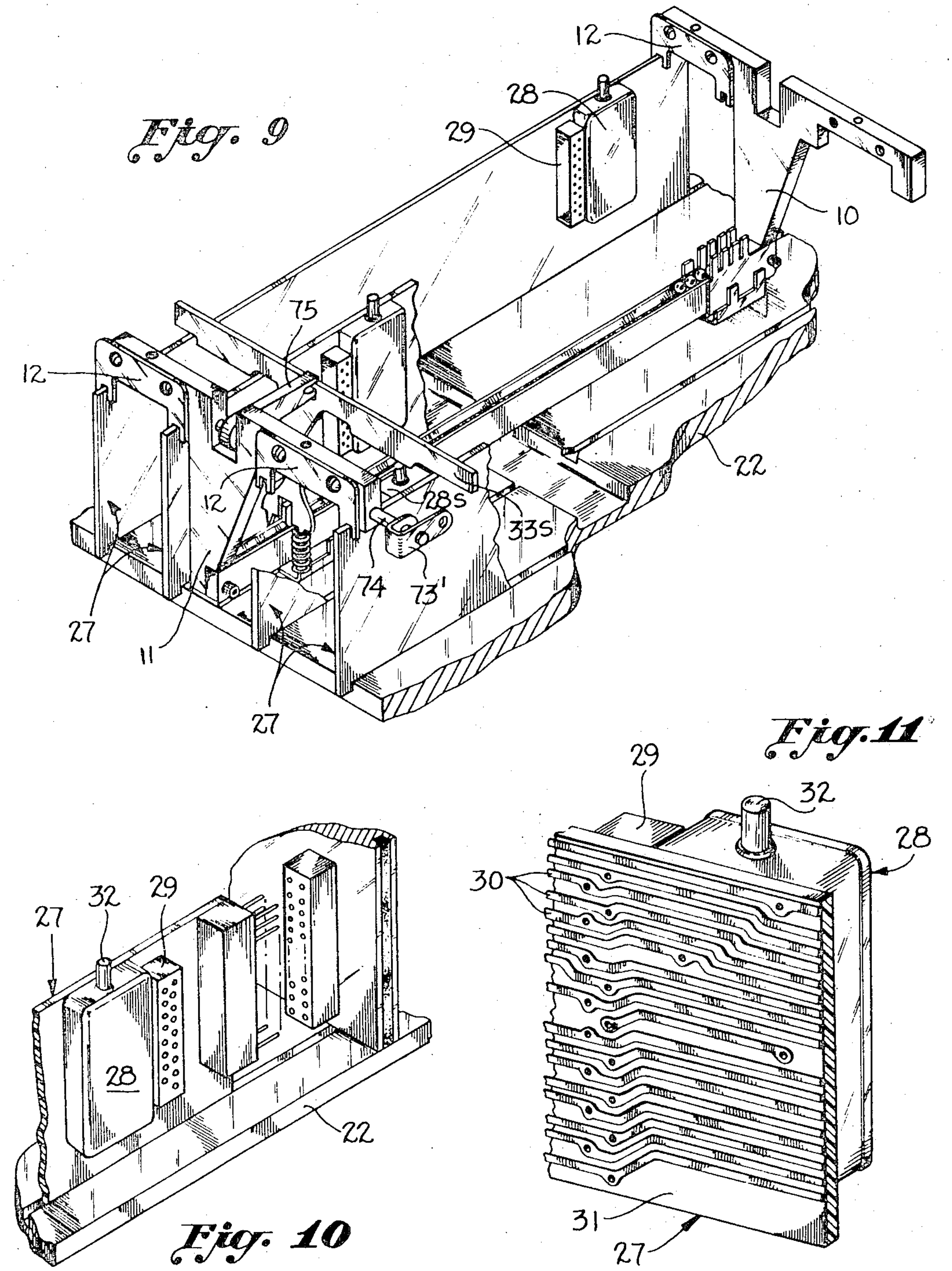
FIG. 9 is a perspective view of various components of the keyboard transmitter shown in FIGS. 2, 3, 4, 5 and 8.
FIG. 10 is a perspective view showing the manner in which each printed circuit board is guided so that it can be removably connected to an electrical connector.
FIG. 11 is a perspective view showing a fragmentary portion of printed circuit board having printed conductors on its one side and an associated switch and code device secured to its other side.

Each switch 28 is closed by depression of its plunger 32 (FIG. 11). As is evident from FIG. 4, the switches 28 and in particular their plungers 32 of each printed circuit board 27 are transversely offset from the switches 28 and their plungers 32 of all the other printed circuit boards 27.

Key levers of keys 33 (FIGS. 1 and 4) are mounted for reciprocating movement so as to enable closure of their respective switches 28. With continued reference to FIG. 4, it is apparent that each key lever 33 is perpendicular to the printed circuit boards 27 and is in alignment with only one switch plunger 32. When the selected key 33 is depressed it depresses the plunger 32 of its respective switch 28. That switch 28 is electrically connected with the adjacent code device 29 which in turn is electrically connected with selected ones of the printed conductors 30. Each key lever 33 has an upstanding stem 34 to which a key top or key button 35 (FIG. 1) is frictionally secured. The top plate 23 (FIG. 6) has a plurality of annular apertures 23' which receive annular rings or grommets 36. Each stem 34 extends through the ring 36. Each key top 35 has an annular guide portion or shank 37 which is guidingly received by the ring 36.

Figures 5, 6, 6A, 7, 8:
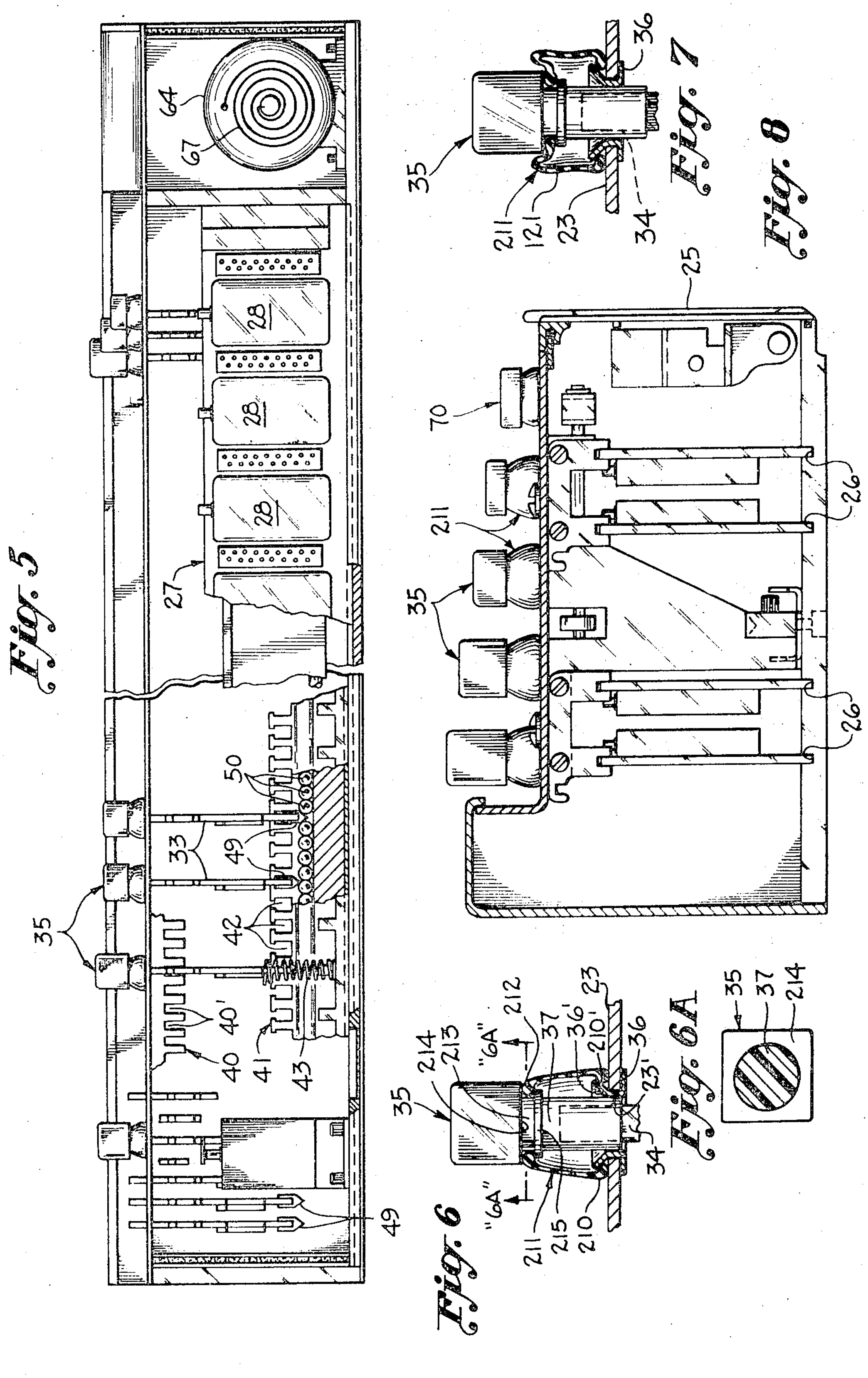
FIG. 5 is a sectional view taken along line 5—5 of FIG. 4.
FIG. 6A is a sectional view taken generally along line 6A—6A of FIG. 6.
FIG. 6 is a sectional view of a fragmentary portion of the top plate of the keyboard housing, a key button or a key top, and a weather seal, shown in the position in which the key button has not been depressed.
FIG. 7 is a view similar to FIG. 6, but showing the key top in the depressed position.
FIG. 8 is an end view of the keyboard transmitter with the end plate removed, taken generally along line 8—8 of FIG. 1.

The keyboard 20 is completely weathersealed by various seals. Every one of the symbol keys 33, the shift and shift lock keys 83, 84, and 106, and the spacer bar 70 is provided with a key-top seal 211 (FIG. 6). The stem 37 of each key top 35 makes a guiding fit with the respective ring 36. The ring 36 has an annular flange 36' which makes an acute angle with the outer surface of the top plate 23 and provides a continuous annular groove 210' in which one beaded annular end of bead 210 of a weather impervious resilient elastomeric seal 211 is received. Another beaded annular end or bead 212 of the seal 210 is received in annular groove 213 formed by lower surface 214 of the bead of the key button 35 and an integral annular flange or ring 215. Normally each of the beads 210 and 212 has an inside diameter which is less than the diameter of its respective groove. Thus, when the seal 211 is positioned as shown in FIGS. 6 and 7 the bead 210 snugly grips the ring 36 at groove 210', and the bead 212 snugly grips the key button 35 at the groove 213. As the groove 210' is formed in part by the marginal portion of the plate 23 which is adjacent the aperture 23', and accordingly, the bead 210 also is in sealing engagement with the plate 23. Except for the beads 210 and 212, the seal 211 has a very thin wall. By way of example not limitation, the wall thickness is about 0.010 of an inch. Because of this thinness and the general shape of the seal 211, the side wall of the seal 211 readily collapse as soon as the seal 211 is slightly depressed. As a consequence the biasing effect which the seal 211 imparts to its respective key is negligible.

The keys 33 are guided for reciprocable movement in guide slots 40' (FIG. 5) in spaced apart combs 40 secured to the top plate 23. The combs 40 extend perpendicularly with respect to the keys 33. A pair of spaced apart upstanding guides 41 are provided with spaced apart slots 42. Each key lever 33 is guidingly received in its respective slot 42.

Two of the four illustrated printed circuit boards 27 are disposed on one side of a ball-type interlock 38 (FIG. 4) and a keyboard locking member 39 (FIG. 4), while the other two printed circuit boards 27 are disposed on the other side of the interlock 38 and the locking member 39. The key buttons 35 of the keys or key levers 33 are disposed relatively close to the plungers 32 of the switches 28 which they are to operate. In this way virtually no torque is imparted to the key levers 33 when any key button 35 is depressed. This is especially evident from FIG. 4 in which the key stems 34 are shown to be relatively close to the plungers 32 with which they are associated.

Figure 2:
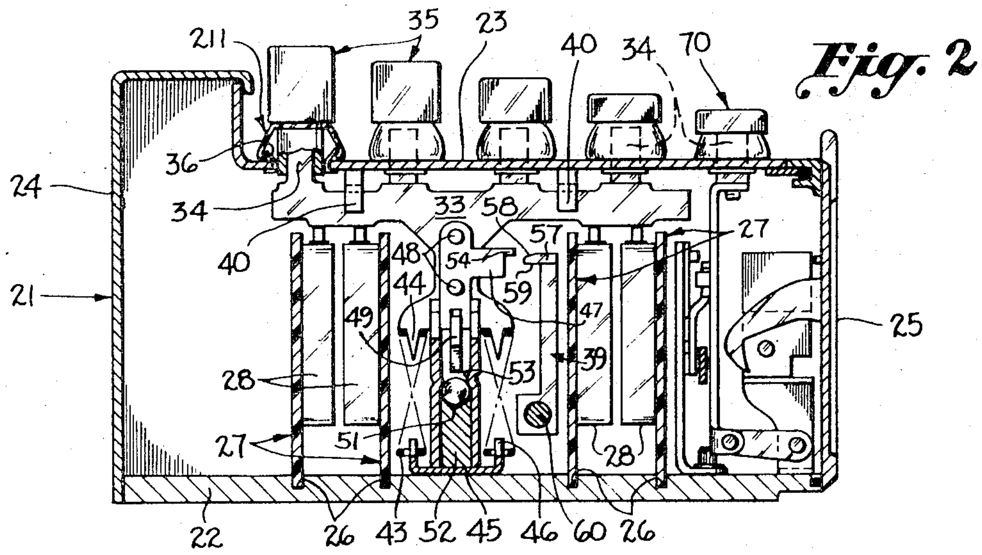
FIG. 2 is a sectional view through the keyboard transmitter along line 2—2 of FIG. 1.

Each key 33 is normally urged upwardly as shown in FIG. 2 for example by a pair of springs 43. Each key 33 has a pair of keepers 44 which receive the upper ends of the springs 43. A generally U-shaped member 45 having a pair of upstanding keepers 46 is secured to the base plate 22. The keepers 46 receive the lower ends of the springs 43. A bracket 47 (FIG. 2) is secured to one side of each key 33 by rivets 48 (FIG. 2). The bracket 47 of each key 33 is in movable engagement between guides 41 (FIG. 5).

Each bracket 47 pivotally mounts a wedge 49. As best shown in FIG. 5, the wedges 49 and balls 50 serve to provide an interlock. The balls 50 can roll in a V-shaped groove 51 of a track member 52. The guides 41 are suitably secured to the sides of the track member 52. The guides 41 have ridges 53 (FIG. 1) extending the length thereof to prevent the balls 50 from being displaced out of their track. When any one of the key buttons 35 is depressed, its key lever 33 forces its wedge 49 downwardly (FIG. 5) between two adjacent balls 50, thereby eliminating all clearance between the remaining balls 50 and in turn preventing any other key 33 from being depressed because its wedge 49 cannot shift the corresponding balls 50. Therefore, only one of the keys 33 can be depressed at a time, thereby preventing an erroneous signal from being generated.

Figure 3:
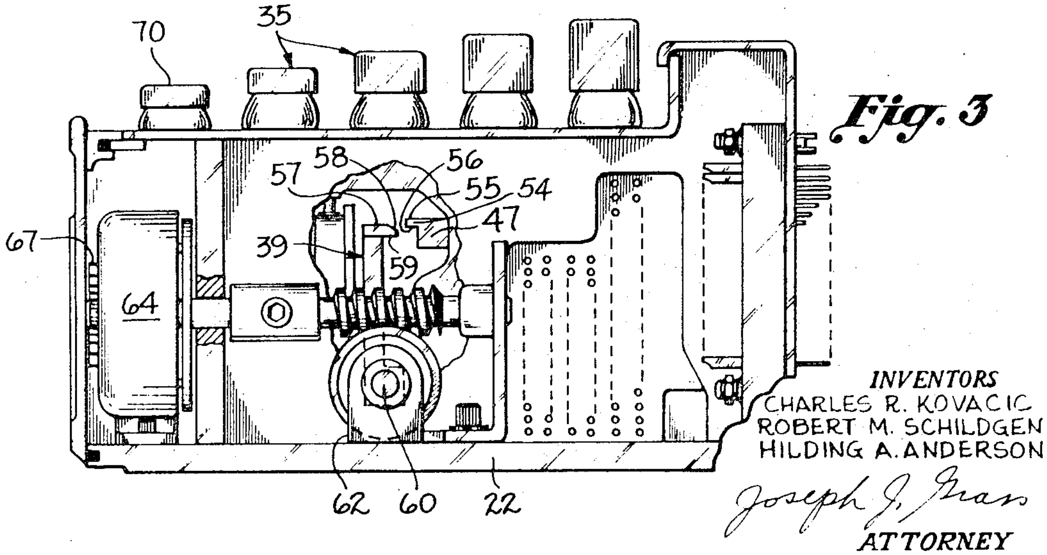
FIG. 3 is an end view with the end plate removed, taken generally along line 3—3 of FIG. 1.

The keys 33 of the keyboard 20 are locked against operation in response to energization of rotary solenoid 64 (FIG. 3). The rotary solenoid has a coil 64' (FIG. 16). When any key of the keyboard 20 is depressed, a signal is generated and is stored in a data register group 200. A parallel-to-serial converter 201 is connected to the register group 200. The converter 201 has a serial signal output conductor 202. Flip-flops 203 and 204 are connected to outputs of the register group 200 and the converter 201, respectively. When the register group 200 and the converter 201 simultaneously contain data, respective flip-flops 203 and 204 will be set to the same state or condition, thereby causing AND gate 205 to be enabled to effect energization of the coil 64' via amplifier 206. Thus, energization of coil 64' will lock the keys 33 against operation until one of the flip-flops 203 and 204 is in the reset state or condition.

Figures 12, 13, 14, 15:
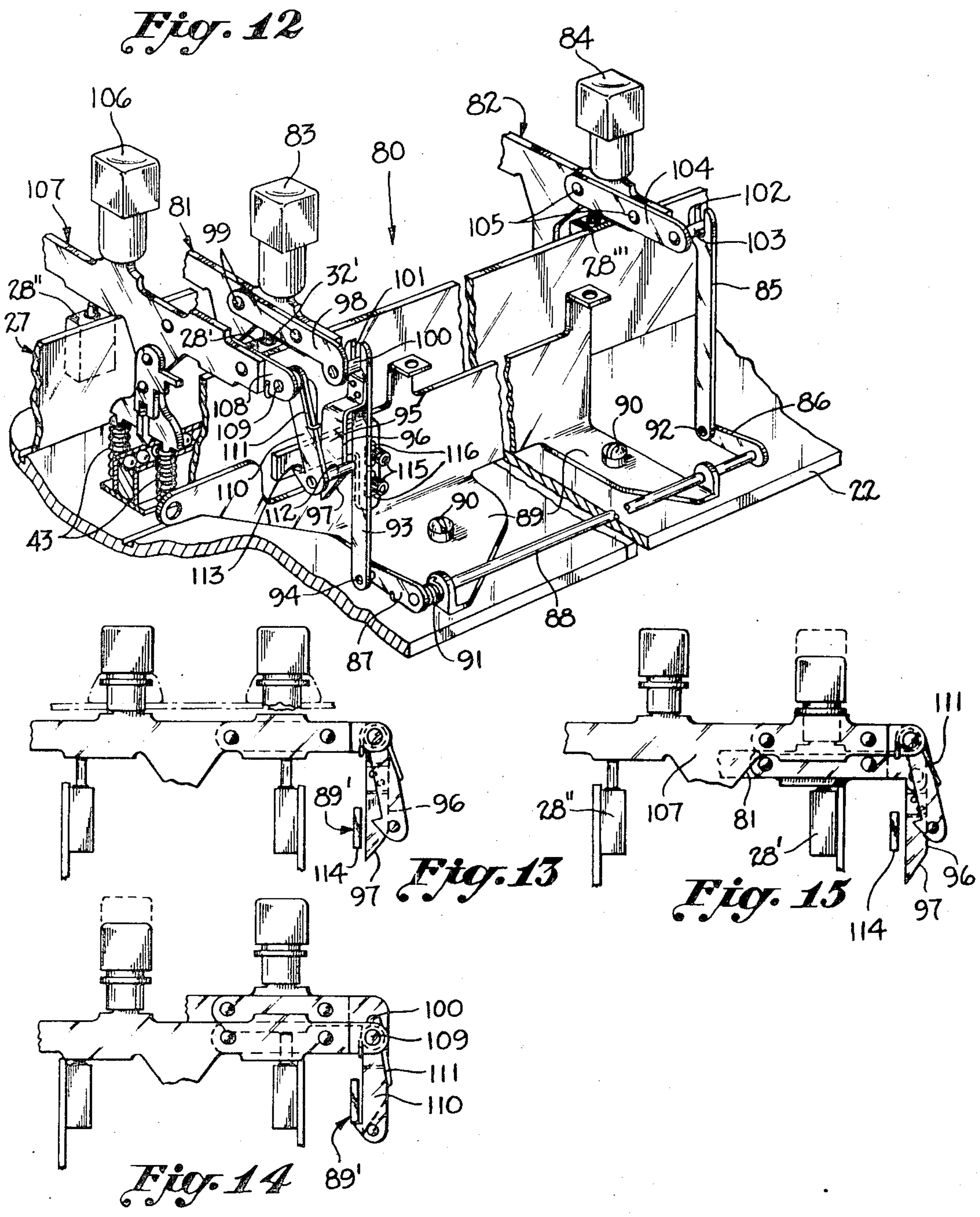
FIG. 12 is a perspective view of a shift and shift-lock control device, with the shift and shift-lock keys being shown in their inactive positions.
FIG. 13 is a side elevational view as seen from the left side of FIG. 12.
FIG. 14 is a side elevational view similar to FIG. 13, but showing the shift-lock key depressed and latched in the depressed condition.
FIG. 15 is a side elevational view similar to FIG. 13, but showing one of the shift keys in its depressed condition.

Each bracket 47 also has a locking projection 54 (FIG. 2, 3 and 12). All the locking projections 54 are in alignment when none of the key buttons 35 is depressed. Each locking projection 54 has abutment surfaces 55 and 56 (FIG. 3). The locking member 39 is common to all the keys 33 and their respective locking projections 54. The locking member 39 includes an elongated locking plate 57 having locking or abutment surfaces 58 and 59 (FIG. 3). When the solenoid 64 is energized, the locking member 39 will be driven clockwise (FIG. 3) so that the surface 59 of locking plate 57 will move into the path of movement of the abutment surface 55 and thus will prevent a depressed key 35 from being returned by the action of associated springs 43 until the locking member 39 has pivoted counterclockwise (FIG. 3) sufficiently so that abutment surface 59 is out of the path of the abutment face 55. In addition, as long as the locking member 39 is in its clockwise position (FIG. 3) the abutment surface 58 of the locking plate 57 will be presented in the path of abutment surfaces 56 of the remaining keys 33, thereby preventing any other key 33 from being depressed.

The locking member 39 is secured to a pivotally mounted shaft 60 which is journalled in a bearing (not shown) at one end of the keyboard 20. The other end of the shaft 60 is journalled in bearings 61 (FIG. 4) mounted in a bracket 62 which is secured to the base plate 22. A worm wheel 63 is secured to the shaft 60. A rotary solenoid 64 drives a worm gear 65 through a coupling 66. The worm gear 65 is in meshing engagement with the worm wheel 63. When the rotary solenoid 64 is energized it causes the worm gear 65 to drive the worm wheel 63 which in turn pivots a shaft 60 and the locking member 39 into a locking position with respect to the keys 33. As soon as the solenoid 64 is de-energized, a spiral spring 67 (FIG. 3) which forms part of the rotary solenoid 64 drives the worm gear 65, the worm wheel 63, the shaft 60 and the locking member 39 in the opposite direction so that the locking member 39 is moved to an ineffective position.

Because solenoid 64 and worm gear 65 are at right angles to the worm wheel 63 and shaft 60, the length of the keyboard 20 kept to a minimum. The worm wheel 63 and worm gear 65 provide a self-locking connection in the drive train for the locking member 39. This self-locking effect prevents any key 33, which is attempted to be depressed, from pivoting the locking member 39 clockwise (FIG. 2) so long as the solenoid 64 is energized. The abutment face or surface 58 is slightly inclined as best shown in FIGS. 2 and 3. When the solenoid 64 is energized, the self-locking connection prevents the depressed key 33 from driving the locking member 39 clockwise (FIG. 2) even though surface 58 is inclined. Assuming that a key 33 is depressed after the solenoid 64 is de-energized and before the spring 67 has effected pivoting of the locking member 39 out of the path of the abutment face of the key 33, the abutment face 56 acting against the inclined abutment face 58 will assist return of the locking member 39 to its ineffective position, shown in FIGS. 2 and 3.

A spacing signal can be generated by manual depression of spacer bar 70 (FIG. 2). Depression of the spacer bar 70 will cause a parallelogram linkage 71 to shift link 72 to the left as viewed in FIG. 4, thereby pivoting links 73 and 73' and shaft 74 so that finger 75 moves lever 33S downwardly. Depression of the lever 33S causes closure of switch 28S and activation of corresponding code device 29S to effect generation of a spacing signal.

Figure 1:
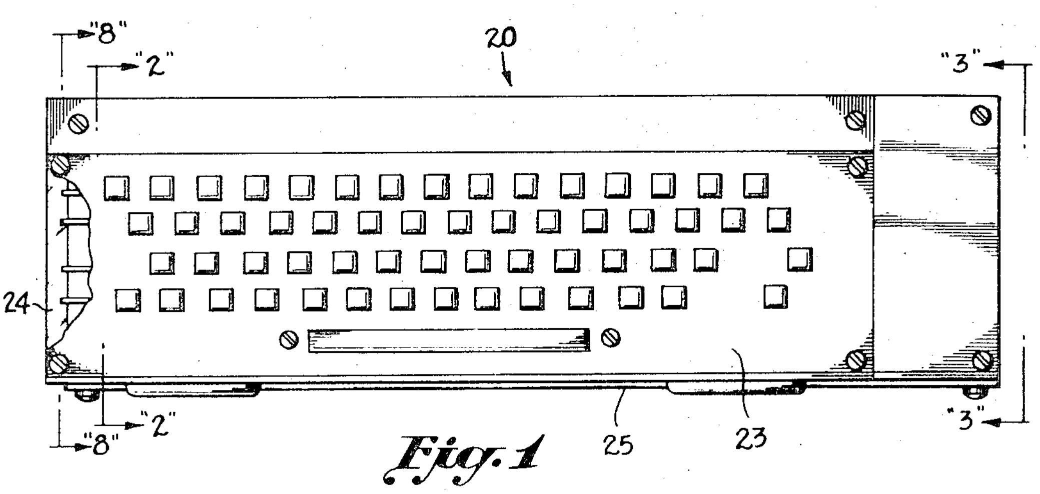
FIG. 1 is a top plan view of a keyboard transmitter in accordance with the invention.

A subassembly is provided by T-shaped brackets 10 and 11 (FIG. 4) which are secured to the track 52, guides 41 (FIG. 5), and member 45 (FIG. 1). This subassembly mounts the levers 33 so that the subassembly can be mountably and demountably secured to frame 22 as a unit. Brackets 10 and 11 mount guides 12 (FIG. 9) for the boards 27.

With reference to FIGS. 12 through 15, there is shown a shift and shift-lock control device generally indicated at 80. The device 80 includes shift keys 81 and 82 having respective key tops or key buttons 83 and 84. Depression of the key button will effect closure of a switch 28', and depression of the key 82 will effect closure of the switch 28'''. Depression of the key top 84 will cause link 85 to be shifted generally downwardly. Arms 86 and 87 are secured to a shaft 88 journalled in a bracket 89. The bracket 89 is secured to the base plate 22 by threaded fasteners 90. A spiral spring 91 received about the shaft 88 and connected to bracket 89 and to the arm 87 normally urges the keys 81 and 82 and their respective key tops 83 and 84 to the up position as shown in FIG. 12. The link 85 is pivotally connected to the arm 86 by a pin 92 and a link 93 is pivotally connected to the arm 87 by a pin 94. Thus, downward movement of the link 85 upon depression of the key top 84 will cause counterclockwise pivoting of the shaft 88 (FIG. 12). Counterclockwise pivoting of the shaft 88 will also cause counterclockwise pivoting of the arm 87 and lowering or downward movement of the link 93. A cam 95 is secured to the link 93. The cam 95 has a generally vertical dwell surface 96 which joins a cam surface 97 which is inclined or sloped considerably with respect to the vertical. A bracket 98 secured to the key lever 81 as by rivets 99 carries a pin 100. The pin 100 is shown in FIG. 12 to bottom in an elongated slot 101 in the link 93. Thus, when the key top 84 of shift key 82 is depressed, the link 95 is moved downwardly but the link 93 does not cause downward movement of the key lever 81 because of the slot 101. Depression of the key top 83 of shift key 81 will cause downward movement of the link 93 and the cam 95, but a slot 102 in the link 85 will prevent the link 85 from moving the key lever 82 downwardly. A pin 103 is carried by a bracket 104 which is secured by rivets 105 to the key lever 82. The pin 103 bottoms at the end of the slot 102 unless the shift key 83 is depressed. Therefore, a shift signal can be generated either by depression of the shift key 81 which effects closure of the switch 28' or by depression of the shift key 82 which effects closure of the switch 28'''.

If it is desired to generate a continuous shift signal, a key button 106 of shift-lock key 107 is depressed. Depression of the key 107, does not affect depression of either one of the shift keys 81 and 82. A bracket 108 riveted to the lock key 107 carries a pin 109 on which a latching element 110 is pivotally mounted. The latching element 110 is biased clockwise (FIGS. 12 through 15) by a spiral spring 111. A pin 112 is secured to the latching element 110. In FIGS. 12, 13 and 15 the pin 112 is shown to be urged against the dwell surface 96 of the cam 95 by the spring 111. Depression of either of the shift keys 81 or 82 will have no effect on the latching element 110 as the pin 112 remains in contact with the dwell surface 96. When the lock key 107 is depressed, the cam surface 97 guides the pin 112 and in turn the latching element 110 from the position shown in FIGS. 12 and 13 to the position shown in FIG. 14. A latching projection 113 is thus guided to a position underlying an abutment surface 114 of the bracket 89' (FIG. 13). The bracket 89' is adjustably secured to the bracket 89 by machine screws 115 which extend through elongated slots 116 in the bracket 89' and are threadably received in threaded holes in the bracket 89. Therefore, the lock key 107 is latched in the position shown in FIG. 14 until such time as either the shift key 81 or the shift key 82 is depressed. Depression of either of the shift keys 81 or 82 will cause the link 93 and the cam 95 to be moved downwardly. Downward movement of the cam 95 effects counterclockwise pivoting of the latching element 110 (FIG. 14) about pin 109 against the force of the spring 111. As soon as the projection 113 of the latching element 110 clears the surface 114 of the bracket 89' the key 107 is free to be returned by the springs 43 thereby causing switch 28'' to be opened.

One of the switches 28 is shown in detail in FIGS. 17, 18 and 20, the other switches 28, 28',28'', 28''', and 28S identical in construction. The switch 28 is shown to include a body or casing 120 and a closure 121. The casing 120 and its closure 121 are preferably constructed of good radio frequency interference shielding material such as brass. The casing 120 is adhesively secured to the printed circuit board 27. A ring or grommet 122 and plate 123 serve to guide the switch plunger 32 for reciprocating movement. The plate 123 is composed of electrically nonconducting material. A ring 123' secured to the plunger 32 is normally urged into abutment with the grommet 122 by one end of a compression spring 124 which encircles the plunger 32. The other end of the spring 124 is in abutment with the plate 123. The spring 124 has an extension 125 which extends through an aperture 125' in the casing 120 and through an aperture in the printed circuit board 27 and is soldered to one of the conductors 126 which forms part of the printed circuit board 27.

A one-piece contact generally indicated at 127 is shown to have equally spaced apart spring contact elements or fingers 128 in contact with a plunger member or plunger portion 129 which is secured to the end of the plunger 32. The fingers 128 are joined to a common marginal or flange portion 128'. The plunger portion 129 is constructed of an electrically nonconducting material. The plunger portion 129 has the same outside diameter as marginal end portion 32'' of the plunger 32. Other than its nonconducting portion 29 and an annular, electrically nonconducting cap 32'', the plunger 32 is electrically conducting material such as steel. As shown in FIGS. 17 and 18, the fingers 128 are resiliently urged against the plunger portion 129. The contact 127 is composed of a single strip of resilient, electrically conductive, material such as spring brass. FIG. 19 is a developed view of the strip prior to being wrapped about the annular mounting member 131. The strip has a plurality of slots 132 which form the individual spring fingers 128. The flange portion 128' is shown in FIGS. 17 and 18 to be wrapped about the mounting member 131 and its lower edge 128'' abuts shoulder 131' of the member 131. A continuous annular retaining ring 132, which is composed of electrically nonconducting material, is press fitted about the flange portion 128' and the lower portion of the member 131 below the shoulder 131'. The ring 132 thus presses the flange 128' of the contact 127 against the annular outer surface of the mounting member 131. A conductor 133 is secured to the contact 127 and passes through a grommet 134 composed of electrically nonconducting material. The mounting member 131 and contact fingers 128 are secured to the casing 120 in axial alignment with the plunger 32 by screw 120'. Because the plunger portions 129 and 32' are in end-to-end abutment and have the same outside diameters, the outer surface of the plunger 32 provides a smooth uninterrupted surface. Moreover, the contact fingers 128 make good contact either with the plunger portion 129 or the plunger portion 32' depending upon the position of the plunger 32. Therefore, "switch bounce" is kept to a minimum as the plunger 32 moves between a position in which plunger portion 129 is in contact with spring fingers 128 and a position in which plunger portion 32' is in contact with spring fingers 128.

The switch 28 shown in FIGS. 17 and 18 is electrically connected to conductors designated 126*a* and 126*b* in FIG. 18; closure of the illustrated switch 28, therefore, electrically connects conductors 126*a* and 126*b*. In particular, depression of the plunger 32 establishes a circuit between conductors 126*a* and 126*b* via spring 124 and its extension 125, the ring 123', the plunger 32, the contact 127, and the conductor 133. The conductor 126*a* is connected to a source of electrical energy, and the conductor 126*b* is connected to the code device 29.

The code device 29 which is shown in FIGS. 17 and 22 comprises a mounting block or body 140 which is composed of an electrically nonconductive material. A common conductor 141 formed by a strip of electrically conductive material such as copper foil is adhesively secured to the body 140. A conductor 142 extends through a bore 143 in the body 140 and is soldered at one end to the conductor 126*b* and at its other end to the common conductor 141. The body 140 contains additional bores 144. Electronic components which are illustrated to be diodes 145 are received in predetermined ones of the bores 144. These diodes 145 are connected to respective ones of the conductors 126, and conversely the number and location of the diodes 145 determines the code which is generated upon closure of the associated switch 28. This is diagrammatically illustrated in FIG. 16 in which two code devices 29 are shown to have their diodes 145 connected to predetermined conductors 126 by plug-in type contacts 146. The code devices 29 provide a diode matrix, in which each individual code device 29 can generate a predetermined signal when its associated switch 28 is closed.

Other embodiments and modifications of this invention will suggest themselves to those skilled in the art, and all such of these as come within the spirit of this invention are included within its scope as best defined in the appended claims.

We claim:

1. A keyboard transmitter comprising:

a frame, a removably mounted subassembly including a plurality of movably mounted symbol keys and a keyboard interlock for enabling only one symbol key at a time to be depressed, signal generating means cooperatively disposed relative to said symbol keys, said signal generating means including a plurality of printed circuit boards mounted by said frame, a plurality of single pole-single throw switches mounted on each printed circuit board, each switch being operable by a respective symbol key, and a plurality of code means mounted adjacent each of said switches, said printed circuit board switches being arranged in parallel rows, said keys extending generally perpendicularly across said rows, only one switch of said prallel rows being in alignment with and actuatable by any one key, the switches of one row being offset with respect to the switches of each other row, and means electrically connecting each code means with its respective switch and with printed conductors of said printed circuit boards to control generation of a symbol corresponding to a selected key.

2. A keyboard transmitter in accordance with claim 1 and further including a keyboard lock engageable with said keys for selectively locking said keys against operation, said keyboard lock including a movably mounted locking member disposed between two of said printed circuit boards and means including a drive motor disposed beyond the ends of said printed circuit boards for moving said locking member between a first position out of engagement with said keys and a second position in locking engagement with said keys.

* * * * *